US008228015B2

(12) United States Patent
Williams

(10) Patent No.: US 8,228,015 B2
(45) Date of Patent: Jul. 24, 2012

(54) SERVOMOTOR SPEED CONTROL

(75) Inventor: Christopher Hugh Williams, Essex (GB)

(73) Assignee: Neopost Technologies, Bagneux (FR)

( * ) Notice: Subject to any disclaimer, the term of this patent is extended or adjusted under 35 U.S.C. 154(b) by 413 days.

(21) Appl. No.: 12/510,680

(22) Filed: Jul. 28, 2009

(65) Prior Publication Data

US 2010/0026229 A1     Feb. 4, 2010

(30) Foreign Application Priority Data

Jul. 30, 2008   (GB) .................................. 0813905.7

(51) Int. Cl.
    *G05B 19/23*   (2006.01)
(52) U.S. Cl. .......................... 318/574; 318/573; 318/626
(58) Field of Classification Search .................. 318/574, 318/573, 626, 568.11, 611, 276
    See application file for complete search history.

(56) References Cited

U.S. PATENT DOCUMENTS

| 5,859,516 A | 1/1999 | Muller et al. |
| 6,050,706 A | 4/2000 | Ohtuka et al. |
| 2001/0056324 A1* | 12/2001 | Miyazawa .................... 701/200 |

FOREIGN PATENT DOCUMENTS

| EP | 0 320 515 A1 | 6/1989 |
| GB | 2277172 A | 10/1994 |
| JP | 2001-048223 A | 2/2001 |

* cited by examiner

*Primary Examiner* — Karen Masih
(74) *Attorney, Agent, or Firm* — Sughrue Mion, PLLC

(57) ABSTRACT

A method for controlling a servomotor for driving a movable part of a machine, the method comprising: determining the coordinates of an acceleration and of a deceleration curve for each stage of a cycle of operation to move said part; determining the maximum number of stages required to complete said cycle; initiating the acceleration curve for the first stage of the cycle of operation; and dynamically correcting the cycle of operation, at at least one intermediate point in the cycle, to initiate the deceleration curve appropriate to the stage, at a predetermined decision point, if production line parameters require a change to the operation cycle.

10 Claims, 3 Drawing Sheets

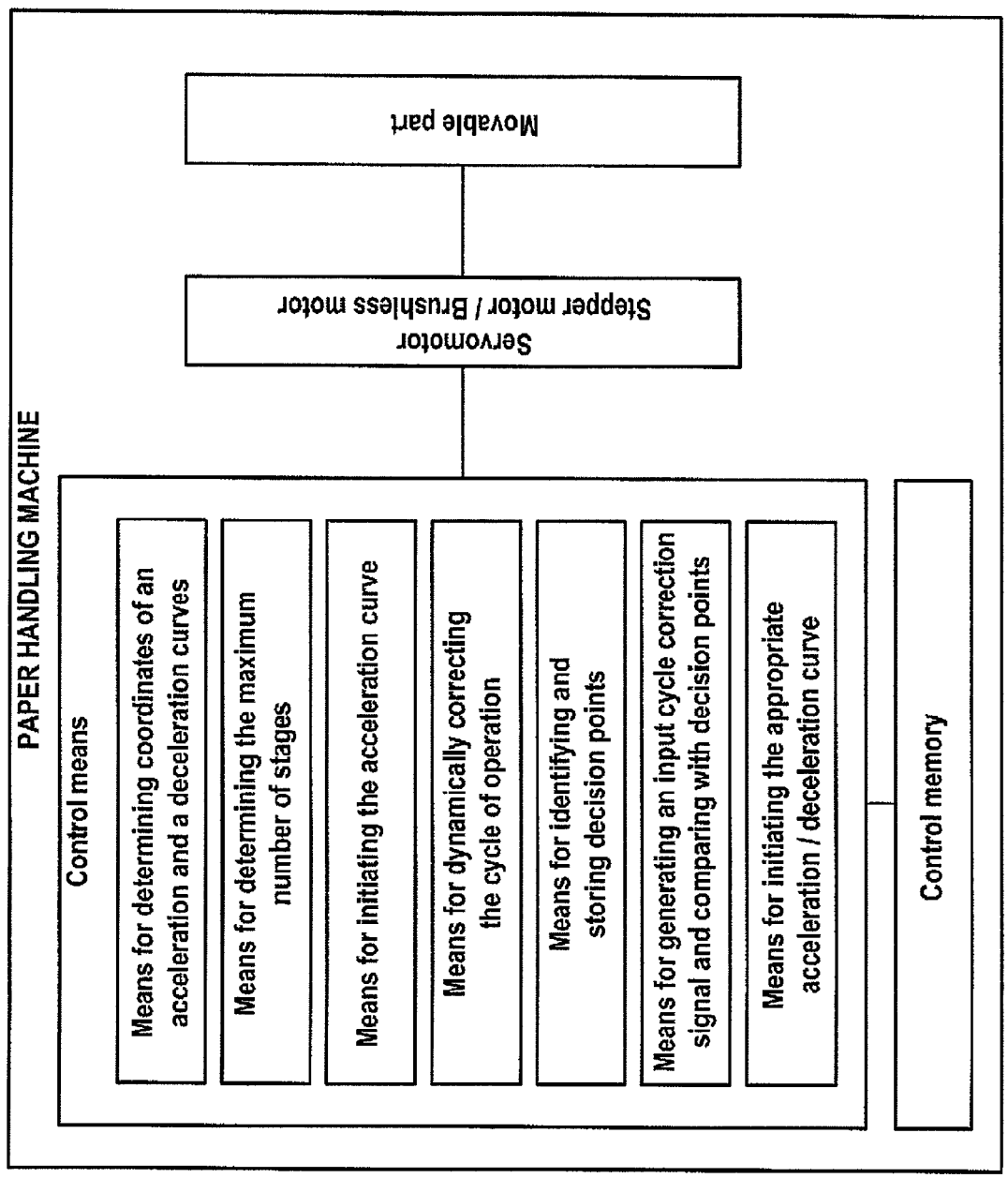

SERVOMOTOR SPEED CONTROL

The present invention relates to a method of controlling a servomotor for driving a load and has particular application for controlling a servomotor in paper handling machines such as for driving a conveyor belt in a mailing system.

Servomotors, whether stepper, brushless or other controllable motors, are used to control individual parts of mechanical machinery in production line systems such as mass mailing machines. They are used to move belts, open flaps and turn rollers. Typically such operations are asynchronous, requiring the completion of a previous event to initiate the next one. Different events require movement of parts over different distances and usually last for different lengths of time. Mechanical mechanisms inherently take a finite time to reach their maximum operation speed and take a finite time to decelerate to a stopped state again. In high capacity production line systems this acceleration and deceleration must be taken into account to ensure accurate sequencing of events. Hence it is usual to estimate the acceleration and deceleration curves of any mechanism in a production line machine, either by prior measurement or calculation, and to take these curves into account in controlling the operation. The running cycle time for an event in such a system thus depends on the acceleration and deceleration curves as well as the distance to be moved and the maximum speed of operation of each part of the machine.

For some events the distance a part must be moved is variable. For example, it may be necessary to move an envelope from a point at which the flap is sealed, to a point at which it is franked and the relative positions of the flap and the franking mark depend upon the size of the envelope. In order to accommodate a range of envelope sizes, the production line needs to be capable of accurately moving the envelope from say point A, to either point B or C or D depending upon the size of the envelope. To do this accurately enough for a high speed machine the acceleration and deceleration curves must be taken into account for each of the steps A to B, B to C, and C to D, even if the particular envelope size for that production run does not require a stop at B or C. This inevitably slows down the overall cycle time for movement from A to D.

It is desirable to decrease the running cycle time of parts of a mechanical system to increase the overall speed of the system and increase its production capacity.

Methods of increasing the accuracy of the positioning of moving parts in machine tools are described in U.S. Pat. Nos. 6,020,706, 5,859,516 and EP 0 320 515, in which various complex procedures are described such as carrying out interpolations; using closed feedback loops; constantly comparing actual speeds to required speeds and making consequential adjustments to control parameters. However, all these methods rely on known conditions to move between two points, or a sensor to initiate stopping of the move. None suggest increasing performance speed in the same way as the present invention.

According to one aspect of the present invention there is provided a method for controlling a servomotor for driving a movable part of a machine, the method comprising: determining the coordinates of an acceleration and a deceleration curve for each stage of a cycle of operation to move said part; determining the maximum number of stages required to complete said cycle; initiating the acceleration curve for the first stage of the cycle of operation; and dynamically correcting the cycle of operation, at at least one intermediate point in the cycle, to initiate the deceleration curve appropriate to the stage, at a predetermined decision point, if production line parameters require a change to the operation cycle.

In one embodiment of the invention at least one acceleration decision point and at least one deceleration decision point are identified and stored in control memory, and, during a cycle of operation, an input cycle correction signal is compared to the stored decision points and the appropriate acceleration/deceleration curve is initiated at the next decision point.

The servomotor may, for example, comprise a stepper motor or a brushless motor and the cycle of operation is typically asynchronous.

According to a second aspect of the invention there is provided control means for controlling a servomotor driving a movable part of a machine, the control means comprising: means for determining the coordinates of an acceleration and a deceleration curve for each stage of a cycle of operation to move said part; means for determining the maximum number of stages required to complete said cycle; means for initiating the acceleration curve for the first stage of the cycle of operation; and means for dynamically correcting the cycle of operation, at at least one intermediate point in the cycle, to initiate the deceleration curve appropriate to the stage, at a predetermined decision point, if production line parameters require early termination of the operation cycle.

Preferably the control means also comprises means for identifying at least one acceleration decision point and at least one deceleration decision point, means for storing the decision points, and means for generating an input cycle correction signal during a cycle of operation and comparing the input cycle correction signal to the stored decision points and means for initiating the appropriate acceleration/deceleration curve at the next decision point.

According to a third aspect of the invention there is provided a paper handling apparatus comprising a control means according the second aspect.

For a better understanding of the present invention and to show how the same may be carried into effect, reference will now be made to the accompanying drawings, in which:

FIG. 5 is a graph illustrating the paper handling machine configuration.

Figure 1:
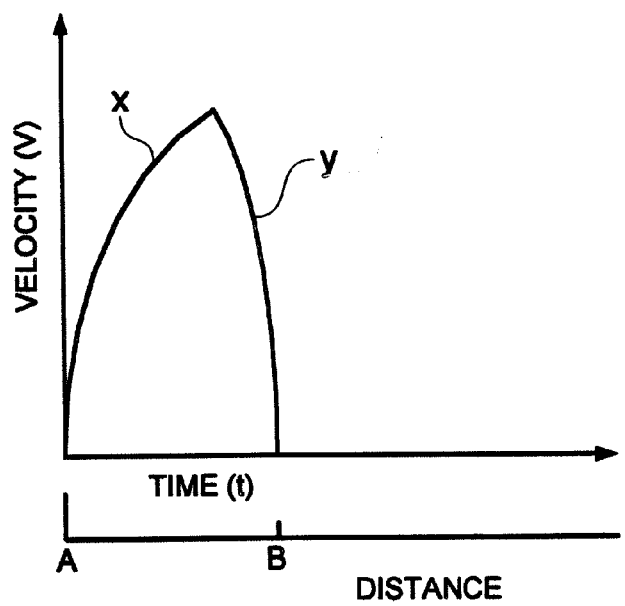
FIG. 1 is a graph illustrating a typical acceleration and a typical deceleration curve with velocity plotted against time.

FIG. 1 is an example of a cycle of operation for a machine part in a production line effecting a move from point A to point B over a distance AB. Velocity V is plotted vertically with time t horizontally. The upward curve x is the acceleration curve and shows how the machine part is accelerated from stationary at position A to velocity V1. The downward curve y is the deceleration curve and illustrates how the speed of the machine part is brought to a stationary state at point B, at time T1.

Figure 2:
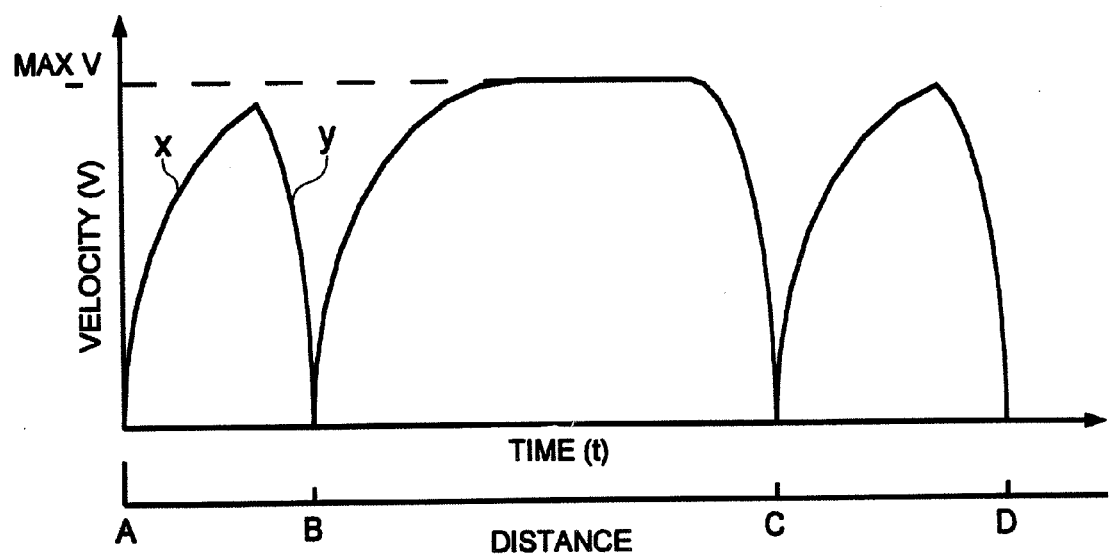
FIG. 2 is a graph illustrating an example of a running cycle comprising three stages.

FIG. 2 illustrates, in a similar way, a running cycle which causes movement from A to D in three stages: from point A to point B, from point B to point C and from point C to point D. This is typically how a known servomotor would be controlled in an asynchronous system. The total time taken for the movement from A to D is T3 which is the sum of the time taken to complete each of the three stages.

Figure 3:
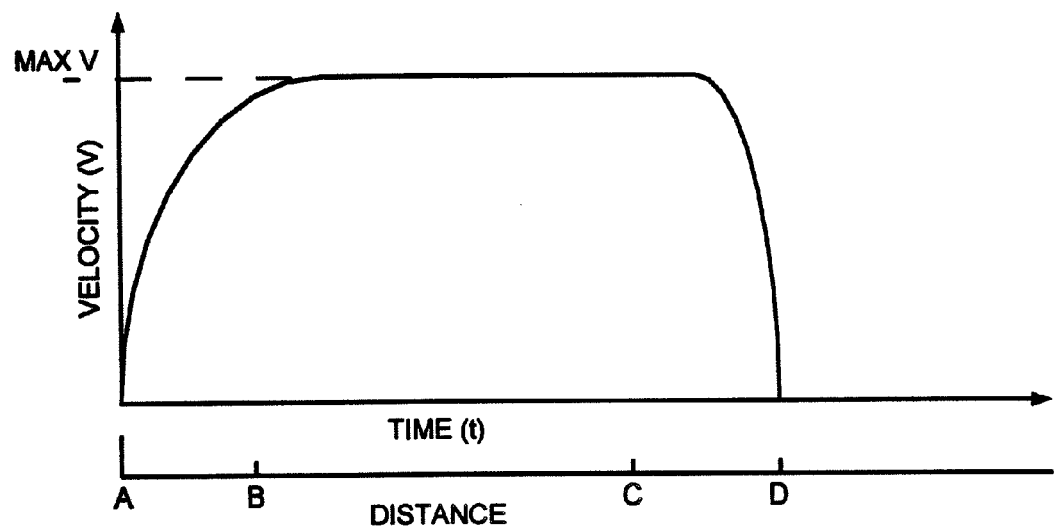
FIG. 3 is a graph illustrating an ideal running cycle for the three stages of FIG. 2.

FIG. 3 illustrates an ideal cycle time for the three stages of movement shown in FIG. 2, where it can be seen that the movement from A to D is effected as a single move thus eliminating the extra time needed to complete the acceleration and deceleration curves in the intermediate moves. The total time taken for movement from A to D in this case is T4 which is less than T3. However to apply this cycle curve to a production system prevents the cycle being able to stop at B or C, and it may be necessary for it to do so in certain conditions. Such conditions may be determined by events upstream or by predetermined conditions for the particular production run, such as envelope size, output conveyor position, or number of folds in a document, amongst many possibilities.

Figure 4:
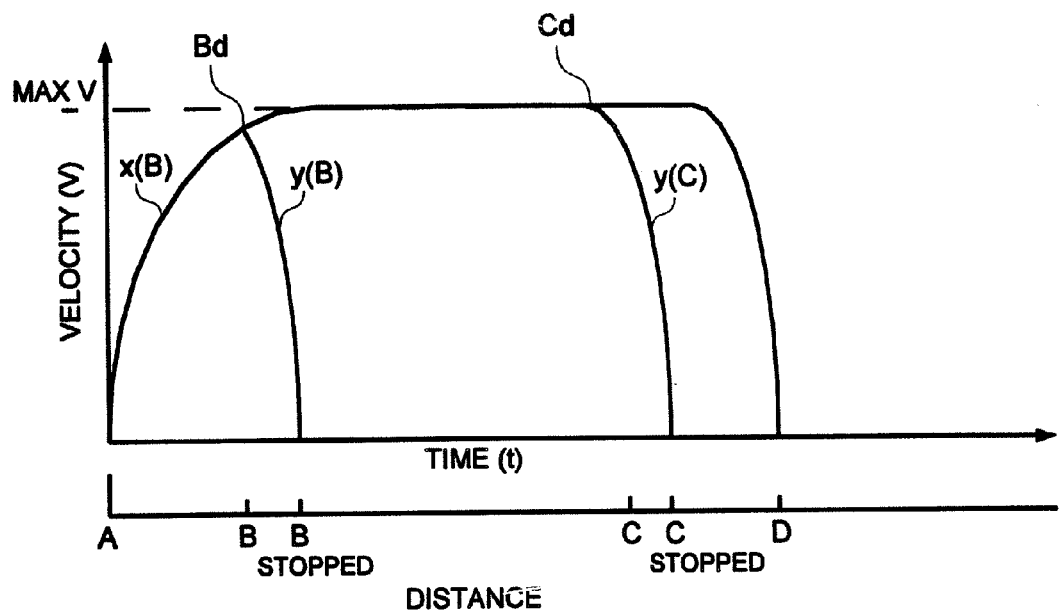
FIG. 4 is a graph illustrating the how the ideal running cycle of FIG. 3 is achievable using the present invention.

FIG. 4 illustrates how the ideal cycle may be achievable with the present invention by controlling the machine parts as though the movement is always from A to D and providing decision points on the velocity/time curve so that the movement can be stopped accurately at point B or point C in those cycles where it is necessary. To do this decision points are made available at Bd and at Cd. If the system detects that it needs to stop the relevant machine part at position B then it initiates the deceleration curve y (B) at point Bd. If it needs to stop the part at position C then it initiates the deceleration curve y(C) at point Cd. The distance Bd-B is the distance travelled by the part in the time taken for the machine part to decelerate to zero velocity, so that if the decision to stop is taken at Bd, the machine part will stop exactly at B. Likewise the distance Cd-C is the distance moved while the machine part decelerates from decision point Cd.

FIG. 5 illustrates the paper handling machine according to the invention.

Any number of stopping points can be created within any cycle depending upon the requirements of the production line. Thus the optimum time for a complete cycle can be achieved, whilst maintaining the capability of stopping the cycle at predetermined positions by dynamically modifying the control curves. Thus the motion path of the driven load can be customised to provide a servomotor adaptive speed control under event dependence.

The invention finds particular application to high capacity production paper handling machines but could be used in any suitable application from materials handling processes to robotics to ensure speedier running cycles for predetermined procedures, whilst allowing modification and early termination of the running cycles depending upon production parameters.

The invention claimed is:

1. A method for controlling a servomotor for driving a movable part of a machine, the method comprising:
    determining the coordinates of an acceleration and of a deceleration curve for each stage of a cycle of operation to move said part;
    determining the maximum number of stages required to complete said cycle;
    initiating the acceleration curve for the first stage of the cycle of operation; and
    dynamically correcting the cycle of operation, at at least one intermediate point in the cycle, to initiate the deceleration curve appropriate to the stage, at a predetermined decision point, if production line parameters require a change to the operation cycle.

2. A method according to claim 1 wherein at least one acceleration decision point and at least one deceleration decision point are identified and stored in control memory, and wherein, during a cycle of operation, an input cycle correction signal is compared to the stored decision points, and the appropriate acceleration/deceleration curve is initiated at the next decision point.

3. A method according to claim 1 wherein the servomotor comprises a stepper motor.

4. A method according to claim 1 wherein the servomotor comprises a brushless motor.

5. A method according to claim 1 wherein the cycle of operation is asynchronous.

6. Control means for controlling a servomotor driving a movable part of a machine, the control means comprising:
    means for determining the coordinates of an acceleration curve and a deceleration curve, for each stage of a cycle of operation to move said part;
    means for determining the maximum number of stages required to complete said cycle;
    means for initiating the acceleration curve for the first stage of the cycle of operation; and
    means for dynamically correcting the cycle of operation, at at least one intermediate point in the cycle, to initiate the deceleration curve appropriate to the stage, at a predetermined decision point, if production line parameters require early termination of the operation cycle.

7. Control means according to claim 6 comprising means for identifying at least one acceleration decision point and at least one deceleration decision point, means for storing the decision points, and means for generating an input cycle correction signal during a cycle of operation and comparing the input cycle correction signal to the stored decision points, and means for initiating the appropriate acceleration/deceleration curve at the next decision point.

8. Control means according to claim 6 wherein the servomotor comprises a stepper motor.

9. Control means according to claim 6 wherein the servomotor comprises a brushless motor.

10. A paper handling machine comprising control means according to claim 6.

\* \* \* \* \*